United States Patent [19]

Maeda

[11] 4,280,836
[45] Jul. 28, 1981

[54] METHOD OF PREHEATING IRON SCRAPS IN STEEL-MAKING BY THE ELECTRIC ARC FURNACE

[75] Inventor: Yukimasa Maeda, Osaka, Japan
[73] Assignee: Kyoei Steel Ltd., Osaka, Japan
[21] Appl. No.: 155,094
[22] Filed: Jun. 2, 1980
[51] Int. Cl.³ ............................................. C21C 5/52
[52] U.S. Cl. ................................... 75/12; 75/10 R
[58] Field of Search ...................... 75/10-13

[56] References Cited

U.S. PATENT DOCUMENTS

| | | | |
|---|---|---|---|
| 2,805,930 | 9/1957 | Udy | 75/11 |
| 3,033,673 | 5/1962 | Collin | 75/11 |
| 3,150,958 | 9/1964 | Collin | 75/11 |
| 3,163,520 | 12/1964 | Collin | 75/11 |
| 3,224,871 | 12/1965 | Collin | 75/11 |
| 3,276,859 | 10/1966 | Collin | 75/11 |

*Primary Examiner*—P. D. Rosenberg
*Attorney, Agent, or Firm*—Wenderoth, Lind & Ponack

[57] ABSTRACT

A method of preheating iron scraps in steel-making by the electric arc furnace, by utilizing high-temperature exhaust gas to be discharged from the electric arc furnace. This method shortens, to a large extent, the time required for melting iron scraps and economizes in energy.

3 Claims, 3 Drawing Figures

METHOD OF PREHEATING IRON SCRAPS IN STEEL-MAKING BY THE ELECTRIC ARC FURNACE

BACKGROUND OF THE INVENTION

1. Field of the Invention

This invention relates to the method of preheating iron scraps in steel-making by the electric arc furnace and has for its object to preheat iron scraps, before charging them into an electric arc furnace, by utilizing high-temperature exhaust gas to be discharged from the electric arc furnace, thereby economizing in energy. Another object of the present invention is to shorten the time required for melting iron scraps by preheating iron scraps before they are charged into the electric arc furnace, thereby improving the working efficiency of the electric arc furnace and reducing the cost of production. A still another object of the present invention is to remove bad smells given out in a preheating process by utilizing high-temperature exhaust gas.

2. Description of the Prior Art

In general, an electric arc furnace is used for steel-making by melting iron scraps. In this case, iron scraps collected previously are charged into the electric arc furnace, where the iron scraps are melted by a high temperature attained by electric arc generated in the electric arc furnace and high-temperature exhaust gas (usually higher than 1,000° C.) containing much dust is discharged into the atmosphere. Therefore, most of the steel-making factories are full of dust and involve a bad working environment. Also, as iron scraps of the normal temperature are charged as they are into the electric arc furnace, it takes much time to melt iron scraps.

DETAILED DESCRIPTION OF THE INVENTION

The present invention will be described below with reference to a preferred embodiment, in which.

Figure 1:
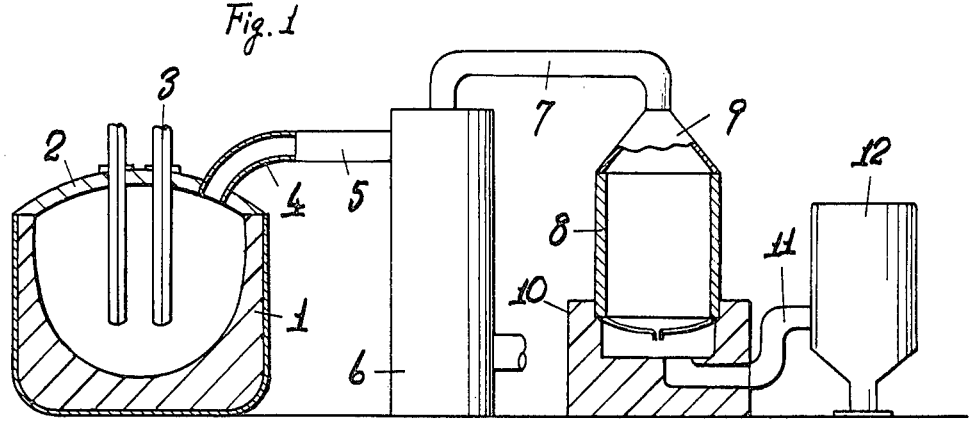
FIG. 1 is a front view of an apparatus for preheating iron scraps according to the present invention, partly broken away.
Figure 2:
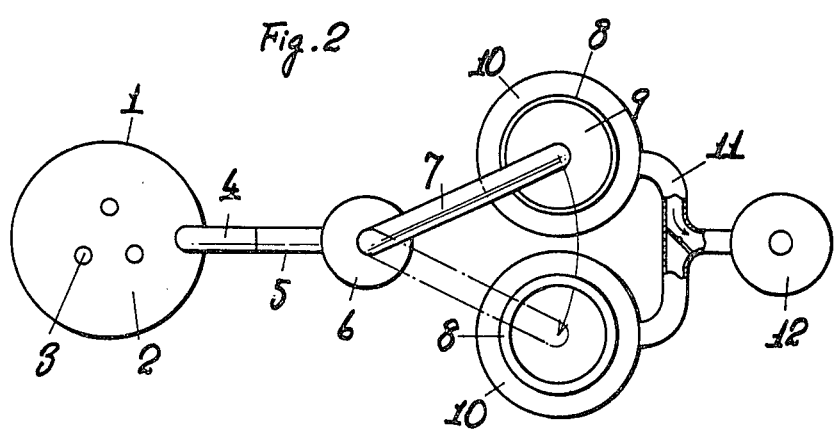
FIG. 2 is a plan view of the apparatus shown in FIG. 1.

Numeral 1 denotes an electric arc furnace having the required steel-making capacity. The furnace 1 has at the top thereof a furnace roof 2 through which a plurality of electrodes 3 are put in the furnace. The furnace roof 2 is removably fitted to the top of the furnace and is provided with an exhaust gas duct 4 through which high-temperature exhaust gas of higher than 1,000° C. and containing much dust is discharged from the electric arc furnace.

The exhaust gas duct 4 leads to a combustion tower 6 via a duct 5. Combustible gas included in high-temperature exhaust gas led into the combustion tower 6 from the electric arc furnace 1 burns completely in the combustion tower 6, where scrap pieces of the size beyond tolerance, large dust, etc. are removed by falling by their own weight. The combustion tower 6 has a proper height and high-temperature exhaust gas from the electric arc furnace is led into the tower at its top portion, where the exhaust gas is burnt completely to remove combustible gas, dust, etc. and the exhaust gas thus adjusted is discharged from the tower 6 through a duct 7 which is connected to a charging bucket 8. The duct 7 is funneled at its joint to the combustion tower 6 so that it serves as a lid for the charging bucket 8 and also facilitates uniform flowing of high-temperature exhaust gas into the charging bucket 8. The duct 7 having the lid 9 is adapted to pivot on its joint to the combustion tower or on a certain portion of the duct 7, whereby when the charging bucket 8 mounted on an iron scrap preheating base 10 is taken off the base 10, the lid 9 can be moved to such a position that it does not touch the charging bucket 8. When two or more charging buckets 8 are used, scrap preheating bases 10 of the corresponding number are installed, leaving the space therebetween which allows adjoining charging buckets to move without interfering with each other. By this arrangement, while iron scraps are being preheated in one charging bucket 8 with the lid 9 thereon, in which high-temperature exhaust gas is introduced, iron scraps of the required quantity are charged into the other charging bucket without the lid 9. When the charging bucket is preheated with the lid 9 thereon, high-temperature exhaust gas must not leak out through gaps between the charging bucket and the lid. For preventing such leakage rubber packings are used, for example.

Figure 3:
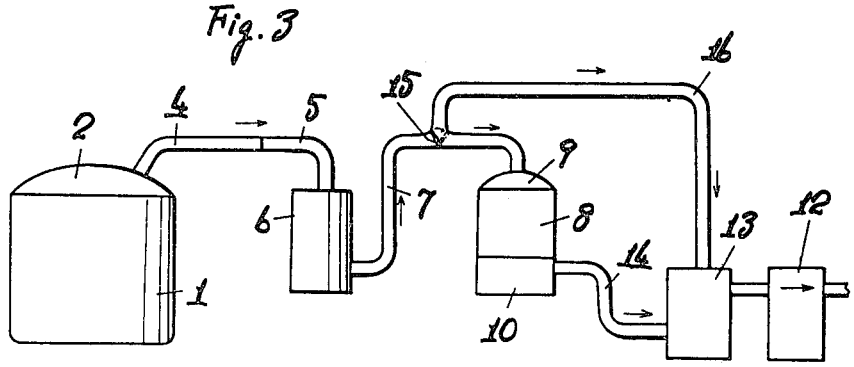
FIG. 3 is a front view of an apparatus for removing bad odors generated from the electric arc furnace by utilizing high-temperature exhaust gas, connected to the apparatus shown in FIG. 1.

When iron scraps were preheated fully, the lid 9 is taken off the charging bucket 8 and is swung. Then the charging bucket containing the preheated iron scraps is moved as it is hung by a crane or the like and the preheated iron scraps are charged into the electric arc furnace ready for a melting process. The iron scraps preheating base 10 supports thereon the charging bucket 8 and high-temperature exhaust gas from the combustion tower 6 passes through gaps between scrap pieces in the charging bucket. At this stage iron scraps are preheated by heat exchange and the exhaust gas is led from the bottom of the charging bucket 8 into the preheating base 10 and further is discharged outside the preheating base 10 via a duct 11. The charging bucket 8 is water-cooled by leading the cooling water thereto. The exhaust gas temperature is lowered to hundreds degrees (°C.), preferably 200°-300° C., in the charging bucket 8 due to heat exchange with iron scraps but contains minute dust and offensive odor elements which were produced by heterogeneous substances stuck to or mixed in iron scraps being gasified by a high temperature. This exhaust gas is led into a dust removing machine 12, via the duct 11. At the dust removing machine the desired dust removing work is effected and then the exhaust gas is discharged into the atmosphere. For removing bad odor elements, as shown by FIG. 3 bad odor elements are led into a deodorizing apparatus 13. Bad odor elements in this case are generated by rubber, plastics, paint, etc. being vaporized but can be removed by heating such vaporized substances up to the temperature higher than 500° C., preferably 600°-800° C., at which pyrolysis will take place or they burn completely and thus deodorization is effected.

On the basis of the above principle, while exhaust gas containing bad odor elements to be discharged from the charging bucket is led into the deodorizing apparatus 13, high-temperature exhaust gas from the electric arc furnace via the combustion tower where it was adjusted to non-explosive gas is led into the deodorizing apparatus 13 via a damper 15 and a duct 16 branching from the duct 7. The deodorizing apparatus 13 accommodates therein heat accumulating materials, for example, piles of firebricks in air-permeable state to accumulate heat necessary for deodorizing bad odor elements. By this arrangement, bad odor elements included in exhaust gas from the duct 16 are resolved by heat (burnt completely, if elements are combustible substances) when they contact with the heat accumulating materials in which heat energy is kept at a high temperature higher than 500° C. Exhaust gas containing dust which has passed the deodorizing process is led into the dust-removing machine, where dust is removed, and then discharged into the atmosphere.

According to the present invention, before iron scraps are charged into the electric arc furnace, they are preheated in the charging bucket by high-temperature exhaust gas generated in the electric arc furnace. Therefore, at the stage when iron scraps are charged into the electric arc furnace, they have been heated to a temperature much higher than the normal temperature. Thus, this system has such advantages that the time required for melting up iron scraps can be reduced to a large extent, working efficiency of the electric arc furnace can be improved, economizing in energy can be realized by utilizing heat energy, which has hitherto been discharged uselessly into the atmosphere, for preheating of iron scraps and also by utilizing high-temperature exhaust gas for removing bad odor elements produced in preheating iron scraps.

What is claimed is:

1. A method of preheating iron scraps in steel-making by an electric arc furnace comprising the steps of:

a. burning combustible substances included in high-temperature exhaust gases generated in an electric arc furnace to render the gas non-explosive;
   b. directing the non-explosive high-temperature exhaust gases into a charging bucket to preheat iron scraps in the charging bucket up to a predetermined temperature;
   c. supplying said preheated iron scraps into the electric arc furnace;
   d. directing any malodorous gases generated by the evaporization of elements stuck to the iron scraps in the electric arc furnace, which gases are emitted directly from the electric furnace and charging bucket into a deodorizing apparatus; wherein the deodorization is effected by pyrolysis or burning of the malodorous elements in the exhaust gases;
   e. directing the deodorized gases into a dust removing machine; and
   f. discharging the thus-deodorized gases into the atmosphere.

2. A method according to claim 1 wherein the temperature of the exhaust gas leaving the electric furnace is over 1000° and wherein the gas is cooled down to between about 200° C. and 300° C. in the charging bucket and the deodorization is effected at temperatures higher than 500° C.

3. A method according to claim 2 wherein the deodorization is effected at temperatures between about 600° to 800° C.

* * * * *